June 5, 1962            G. M. MARTIN            3,037,396
BACKLASH PREVENTING GEARS FOR COUPLED DRIVEN AND DRIVE SHAFTS
Filed May 11, 1959            2 Sheets-Sheet 1
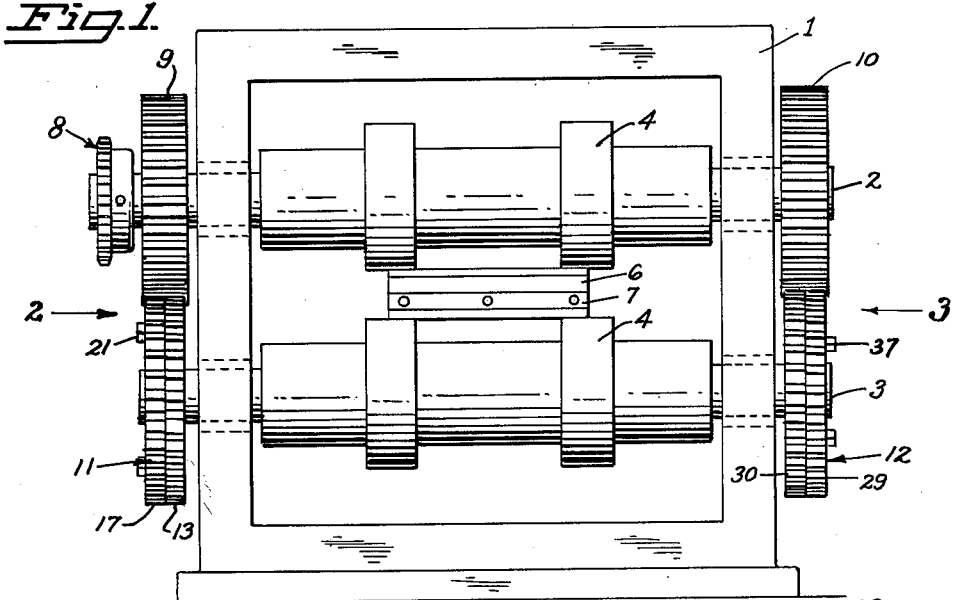
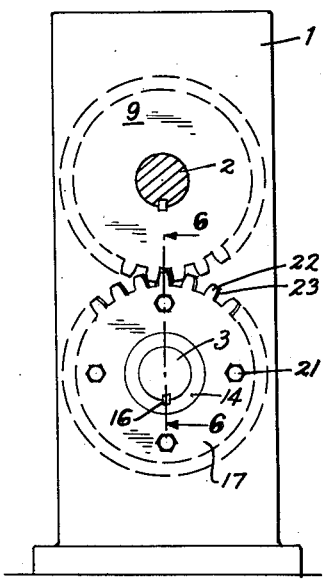
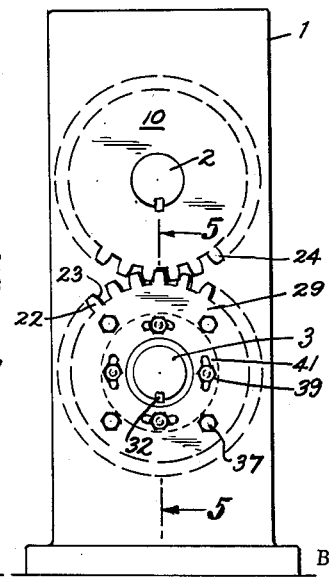
INVENTOR.
GEORGE M. MARTIN
BY *George B. White*
ATTORNEY June 5, 1962  G. M. MARTIN  3,037,396
BACKLASH PREVENTING GEARS FOR COUPLED DRIVEN AND DRIVE SHAFTS
Filed May 11, 1959  2 Sheets-Sheet 2
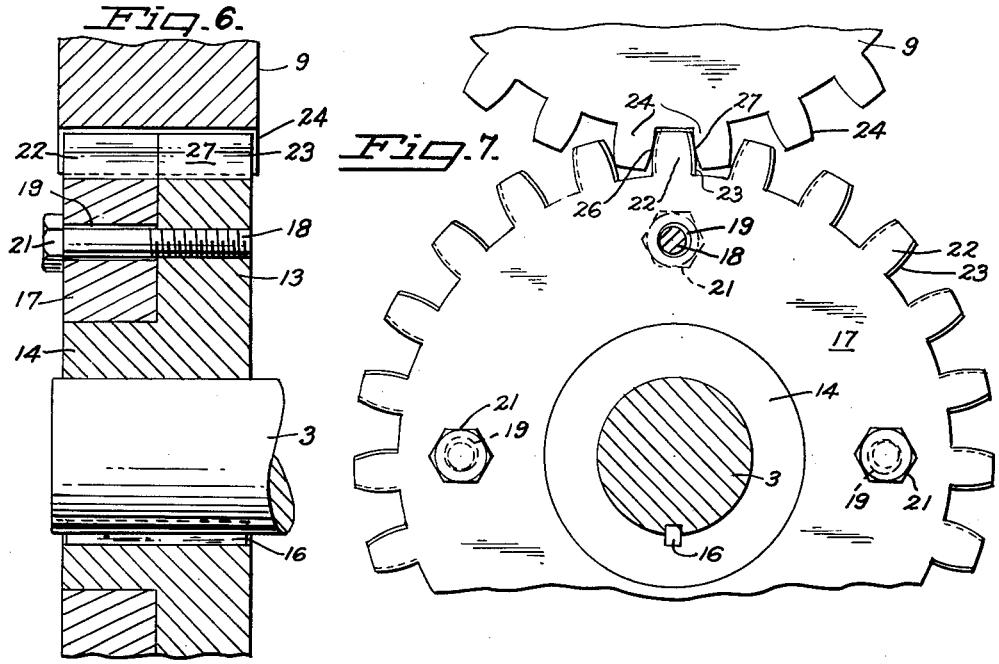
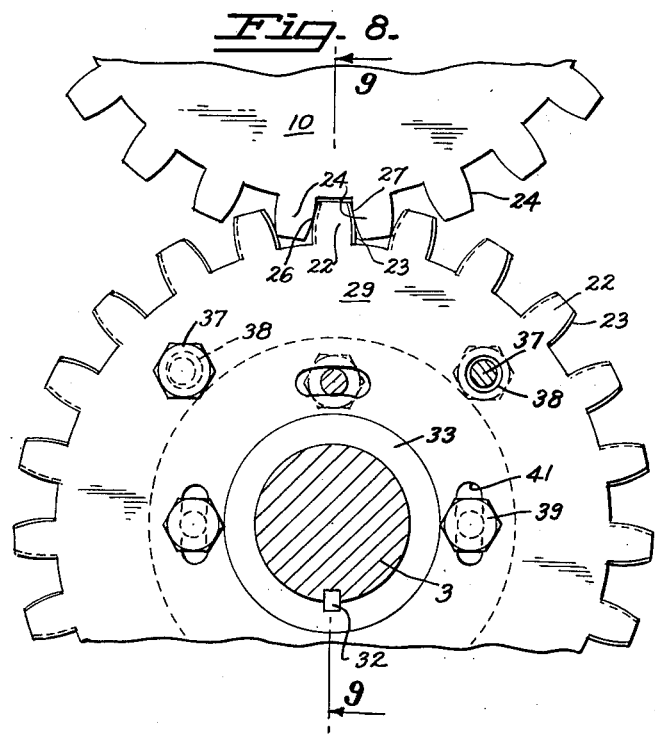
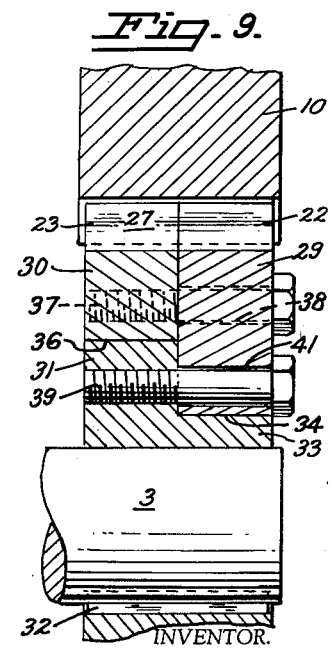
INVENTOR.
GEORGE M. MARTIN
BY
ATTORNEY.

United States Patent Office 3,037,396
Patented June 5, 1962

3,037,396
BACKLASH PREVENTING GEARS FOR COUPLED DRIVEN AND DRIVE SHAFTS
George M. Martin, Emeryville, Calif., assignor to Merrill D. Martin, Oakland, Calif.
Filed May 11, 1959, Ser. No. 812,407
4 Claims. (Cl. 74—409)

This invention relates to backlash preventing gears for coupled driven and drive shafts and particularly for cutting machines.

In comparatively heavy machinery where a drive shaft drives a driven shaft through meshing gears, especially in connection with the driving and driven shafts devices having cooperating means, such as cutting blades, on the shafts which are to remain in preselected alignment axially and angularly of the shafts, acceleration, deceleration or weaving of the frame causes misalignment of the shafts and this in turn causes a condition of misalignment of the cutter blades to such an extent that the blades separate and climb on one another and thereby wear out rapidly and do not cut accurately. An attempt to solve this problem included the providing of superimposed combined driven gears offset relatively to one another so as to suitably mesh with the driving gear on one end of the shaft, but this caused misalignment because while the backlash was removed on one end, it created a cantilever torque which caused the driven gear to twist the frame and be misaligned, thereby bringing the cutter blades or dies out of alignment. Another attempt was to provide a driving gear at each end of the driving shaft and a meshing driven gear at each end of the driven shaft so that the driven shaft was driven at both ends. This last arrangement prevented misalignment in one direction only, namely in the driving direction, but when there was a sudden acceleration or deceleration or stopping, then the driven shaft and the frame deflected to such an extent as to cause serious misalignment. The torque is so great in such structures that light frames were twisted and on heavy frames the bearings were worn off center very quickly.

The primary object of this invention is to provide positive backlash prevention at both ends of the driven shaft, thereby to prevent backlash both in the driving direction and also in the opposite direction and removing all twisting strain from the shaft and positively preventing the shafts or dies or blades thereon from getting out of alignment.

The invention is not limited to use with cutting blades, but may be used on embossing and scoring presses of the rotary type, as well as in other arrangements where cooperable means are provided on parallel shafts are to remain in preselected alignment axially and angularly of the shafts, and which are subject to strains, such as torsion.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangement and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a side view of a cutting machine showing the driving gears and the backlash preventing combination gears on the opposite ends of the shafts.

FIG. 2 is a somewhat diagrammatic partly sectional end view of the machine viewing in the direction of the arrow 2 of FIG. 1.

FIG. 3 is another end view of the machine viewing it in the direction of the arrow 3 of FIG. 1.

FIG. 4 is a fragmental, perspective view showing the offset teeth of the superimposed backlash prevention gears.

FIG. 5 is a fragmental sectional view taken on the lines 5—5 of FIG. 3.

FIG. 6 is an enlarged fragmental sectional view taken on the lines 6—6 of FIG. 2.

FIG. 7 is a face view of the portion of the gears shown in FIG. 6.

FIG. 8 is a fragmental end view from the direction of the arrow 3 showing on a larger scale the meshing of the gears on that end, and FIG. 9 is an enlarged sectional view taken on the lines 9—9 of FIG. 8.

In rotary cutting machines generally there is provided a frame 1, in which are suitably journalled a drive shaft 2 and a driven shaft 3. The shafts 2 ad 3 are parallel and rotate on parallel axes. On the drive shaft 2 and the driven shaft 3 are a pair of suitable rolls or cutter supports 4. Suitable cutting blades or dies 6 and 7 are provided on the respective rolls 4 on the respective shafts 2 and 3.

The construction above described is conventional and therefore it is shown somewhat diagrammatically without many structural details.

The drive shaft 2 receives its power through a usual transmission gearing 8.

The novelty of the herein device resides in providing at the opposite ends of the drive shaft 2 drive gears 9 and 10, and providing on the opposite ends of the driven shaft 3 backlash preventing superimposed driven gear combinations 11 and 12 respectively in mesh with the drive gears 9 and 10. In this manner driving power is delivered simultaneously and uniformly to both ends of the driven shaft 3 and the driving torque on the ends of the driven shaft 3 is substantially equalized.

Each of the backlash preventing gear units 11 and 12 is formed of a pair of superimposed gears. The driven gear unit 11 includes a gear 13 which has a hub 14 keyed by a suitable key 16 to the end of the driven shaft 3. The hub 14 extends outwardly beyond the width of the gear 13 so as to accommodate thereon the ring gear 17. The peripheries of the gear 13 and ring gear 17 generally complement each other to form a gear of about the same width as the adjacent driving gear 9. The ring gear 17 is secured on the driven gear 13 by suitable threaded bolts 18 which are threaded into the gear 13. These bolts 18 extend through transverse holes 19 through the ring gear 17 so that the heads 21 of the bolts 18 bear against the outer face of the ring gear 17 to hold it tightly in place. The holes 19 are substantially larger than the diameters of the bolts 18 so as to allow the offsetting of the ring gear 17 relatively to the gear 13. This is accomplished substantially to the extent illustrated in FIGS. 4 and 7. Namely the ring gear 17 is shifted circumferentially relatively to the gear 13 so that the teeth 22 of the ring gear 17 are offset circumferentially with respect to the teeth 23 of the gear 13 substantially to the extent of the usual play of the driven teeth in meshing the teeth 24 of the driving gear 9. The adjacent face 26 of the tooth 22 bears against a face of a tooth 24 and the opposite face 27 of the tooth 23 bears against the adjacent face of the following gear tooth 24. Thereby contact is maintained against both gear teeth 24 and relative play is prevented in either direction.

On the other end of the driven shaft 3 the combination driven gear unit 12 also has pair of superimposed gears complementing each other substantially to the width of the drive gear 10. In view of the necessity for adjustments as hereinafter described, the face to face superimposed members of the gear unit 12 are ring gears 29 and 30. A hub 31 is secured by a suitable key 32 to the end of the driven shaft 3. The hub 31 has a reduced portion 33 which extends outwardly with respect to the shaft 3, which reduced portion is about one half of the the width of the hub 31. The outer ring gear 29 has a hole 34 therein to fit the outer periphery of the reduced portion 33. A hole 36 in the inner ring gear 30 fits the larger periphery of the hub 31. Bolts 37 extend through holes 38 in the outer ring gear 29 and are suitable threaded into the inner ring gear 30. The bolt holes 38 are larger than the bolts 37 to allow the offsetting of the teeth of the ring gears 29 and 30 relatively to one another for the full contact meshing arrangement illustrated in FIG. 8. This arrangement for backlash prevention for engaging the opposite faces of the adjacent teeth 24 in the drive gear, is the same at both ends of the driven shaft 3. Bolts 39 extend through arcuate slots 41 in the outer ring gear 29 and are threaded into the larger portion of the hub 31 for mounting the outer ring gear 29 on the hub 31. All the bolts have the usual heads on their outer ends to bear against the outer face of the outer ring gear 29. The engagement and adjustment therefore of the ring gears 29 and 30 relatively to the hub 31 has considerable range to assure perfect alignment and meshing between the combined gears 12 and the driving gear 10.

In operation, the respective superimposed ring gears or gear in the combination gear units 11 or 12 are arranged as heretofore described for engagement with the opposite faces of adjacent gear teeth of the driving gears 9 or 10 respectively. In the gear unit 12 the mounting bolts 39 are usually loose during shipping so that no strain is transmitted from he driven shaft during the handling of the machine. When the machine is set up for operation, then proper alignment is ascertained and the mounting bolts 39 are finally tightened to the hub 31 thereby assuring accurate alignment and engagement all around.

By the present arrangement of backlash preventing gear units on the opposite ends of the driven shaft 3 torque in both the driving direction and in the opposite direction upon sudden stopping, acceleration or deceleration, is balanced at the opposite ends of the shaft 3 and thereby twisting forces on the shaft 3 and on the frame 1 are positively obviated and the cutting blades 6 and 7 remain accurately aligned performing superior cutting operation for considerably longer duration than in machines provided with the previous unbalanced driving means.

I claim:

1. Backlash preventing transmission means for parallel drive and driven shafts comprising a driving gear at each end of the drive shaft, a driven gear unit at each end of the driven shaft in mesh with each driving gear, the improvement comprising a pair of gears forming each driven gear unit secured to one another face to face and complementing each other to about the width of the adjacent driving gear, the teeth of the superimposed adjacent gears of each driven gear being circumferentially offset so that each pair of relatively offset teeth of the driven gear unit engages opposite faces of adjacent teeth of the meshing driving gear, a plurality of bolts extended through one of the superimposed gears and threaded into the other in each driven gear unit, the hole in the superimposed gear through which said bolt extends being larger than the bolt for relative circumferential adjustment of said superimposed gears relatively to one another, and means to secure at least one of said superimposed gears to the driven shaft, a hub keyed to the other end of the driven shaft, the driven combination gear unit on said other end including a pair of ring gears, means to secure one ring gear to the hub and means to secure the other ring gear to the first gear, said securing means being releasable for circumferential angular adjustment of said ring gears relatively to said hub and relatively to one another.

2. Backlash preventing transmissin means for parallel drive and driven shafts comprising a driving gear at each end of the drive shaft, a driven gear unit at each end of the driven shaft in mesh with each driving gear, the improvement comprising a pair of gears forming each driven gear unit secured to one another face to face and complementing each other to about the width of the adjacent driving gear, the teeth of the superimposed adjacent gears of each driven gear being circumferentially offset so that each pair of relatively offset teeth of the driven gear unit engages opposite faces of adjacent teeth of the meshing driving gear, the driven gear unit at one end of said driven shaft including a gear with a hub extended therefrom and a second gear angularly adjustably held on said hub, and securing means to secure said second ring gear to the first gear in angularly adjusted relation, the driven gear unit at the other end of the shaft including a hub secured on said driven shaft, a pair of ring gears on said hub, one of said ring gears being secured to said hub and the other of said ring gears being secured to the first ring gear, said ring gears being adjustable angularly relatively to one another and relatively to said hub.

3. A machine comprising a pair of parallel drive and driven shafts, cooperable means on said shafts which are to remain in preselected alignment axially and angularly of said shafts and which are subject to strains such as torsion, transmission means for driving said shafts and preventing misalignments between the shafts and consequently said cooperable means, said transmission means including a driving gear at each end of the drive shaft, a driven gear unit at each end of the driven shaft in mesh with each driving gear, a pair of gears forming each driven gear unit secured to one another face to face and complementing each other to about the width of the adjacent driving gear, the teeth of the superimposed adjacent gears of each driven gear unit being circumferentially offset so that each pair of relatively offset teeth of the driven gear unit engages opposite faces of adjacent teeth of the meshing driving gear, and releasable means to fixedly secure each pair of gears together so that the superimposed gears of each pair of gears are unyieldingly united together, the superimposed gears of each pair having equal peripheral width.

4. A machine comprising a pair of spaced parallel drive and driven shafts, cooperable means on said shafts which are in preselected alignment axially and angularly with respect to each other and are subject to strains when said parallel shafts are driven, transmission means for driving said shafts and preventing misalignments between the shafts and consequently said cooperable means, said transmission means including a driving gear at each end of the drive shaft, a driven gear unit at each end of the driven shaft in mesh with each driving gear, a pair of gears forming each driven gear unit secured to one another face to face and complementing each other to about the width of the adjacent driving gear, the teeth of the superimposed adjacent gears of each driven gear unit being circumferentially offset so that each pair of relatively offset teeth of the driven gear unit engages opposite faces of adjacent teeth of the meshing driving gear, and releasable means to fixedly secure each pair of gears together so that the superimposed gears of each pair of gears are unyieldingly united together.

(References on following page)

References Cited in the file of this patent

UNITED STATES PATENTS

| | | |
|---|---|---|
| 851,180 | Mathewson | Apr. 23, 1907 |
| 1,040,063 | Wall | Oct. 1, 1912 |
| 1,386,089 | Butzen | Aug. 2, 1921 |
| 1,493,827 | Stankey | May 13, 1924 |
| 1,722,889 | Bentley | July 30, 1929 |
| 1,746,178 | Alexandrescu | Feb. 4, 1930 |
| 1,969,433 | Smitmans | Aug. 7, 1934 |
| 2,260,402 | Potdevin | Oct. 28, 1941 |
| 2,596,997 | Harter | May 20, 1952 |
| 2,641,937 | Erhardt et al. | June 16, 1953 |